(12) United States Patent
Ivan et al.

(10) Patent No.: US 11,719,056 B2
(45) Date of Patent: Aug. 8, 2023

(54) IDENTIFYING DOWNHOLE CONDITIONS DURING A DRILLING OPERATION USING A VIBRATORY SEPARATOR

(71) Applicant: ExxonMobil Technology and Engineering Company, Spring, TX (US)

(72) Inventors: Catalin D. Ivan, West University Place, TX (US); William C. Morris, Jr., Magnolia, TX (US); Jason Z. Gahr, Columbus, TX (US); Patrick E. Goschy, Katy, TX (US)

(73) Assignee: ExxonMobil Technology and Engineering Company, Spring, TX (US)

(*) Notice: Subject to any disclaimer, the term of this patent is extended or adjusted under 35 U.S.C. 154(b) by 82 days.

(21) Appl. No.: 17/479,114

(22) Filed: Sep. 20, 2021

(65) Prior Publication Data
US 2022/0112778 A1 Apr. 14, 2022

Related U.S. Application Data

(60) Provisional application No. 63/091,674, filed on Oct. 14, 2020.

(51) Int. Cl.
*E21B 21/08* (2006.01)
*E21B 49/00* (2006.01)
(Continued)

(52) U.S. Cl.
CPC ............ *E21B 21/08* (2013.01); *E21B 21/002* (2013.01); *E21B 27/00* (2013.01); *E21B 49/003* (2013.01); *G01H 1/003* (2013.01)

(58) Field of Classification Search
CPC .... E21B 21/002; E21B 21/063; E21B 21/065; E21B 21/08; E21B 21/082; E21B 21/085
See application file for complete search history.

(56) References Cited

U.S. PATENT DOCUMENTS

| 4,809,791 A | 3/1989 | Hayatdavoudi |
| 9,199,278 B2 | 12/2015 | Scott et al. |

(Continued)

*Primary Examiner* — Kristyn A Hall
(74) *Attorney, Agent, or Firm* — ExxonMobil Technology and Engineering Company—Law Department

(57) ABSTRACT

Techniques described herein relate to a method for identifying downhole conditions during a drilling operation using a vibratory separator. The method includes calibrating a sensor system attached to the vibratory separator by periodically measuring the G-force acting on the vibratory separator functioning under steady-state operating parameters. The method also includes determining the relationship between the G-force acting on the vibratory separator and the flow rate and rate of penetration (ROP) for the drilling operation by measuring the G-force acting on the vibratory separator functioning under different non-steady-state operating parameters. The method further includes determining an expected total basket weight for each G-force measurement using the G-force/flow rate/ROP relationship, monitoring a current total basket weight of the vibratory separator functioning under current operating parameters, and identifying a downhole condition if the current total basket weight is greater or less than the expected total basket weight for the current operating parameters.

20 Claims, 10 Drawing Sheets

(51) Int. Cl.
*E21B 27/00* (2006.01)
*E21B 21/00* (2006.01)
*G01H 1/00* (2006.01)

(56) References Cited

U.S. PATENT DOCUMENTS

| | | | |
|---|---|---|---|
| 9,506,337 | B2 | 11/2016 | Smith |
| 10,480,991 | B2 | 11/2019 | Calleri |
| 11,591,868 | B1* | 2/2023 | Perez .................. B07B 1/42 |
| 2005/0242003 | A1* | 11/2005 | Scott ............ B01D 33/0315 |
| | | | 210/388 |
| 2017/0058620 | A1 | 3/2017 | Torrione |
| 2020/0332642 | A1 | 10/2020 | Kulkarni et al. |
| 2020/0363289 | A1 | 11/2020 | Shekhar et al. |
| 2021/0016297 | A1 | 1/2021 | Birchfield et al. |

\* cited by examiner

300

302

304

400

402

404

IDENTIFYING DOWNHOLE CONDITIONS DURING A DRILLING OPERATION USING A VIBRATORY SEPARATOR

This application claims priority to and the benefit of U.S. Provisional Application No. 63/091,674, filed on Oct. 14, 2020, the entire contents of which are incorporated herein by reference.

FIELD

The techniques described herein relate to the field of drilling fluid processing and wellbore analysis. More particularly, the techniques described herein relate to methods for identifying downhole conditions during a drilling operation using a vibratory separator.

BACKGROUND

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

In the drilling of hydrocarbon wells, a wellbore is formed within a formation using a drill bit that is urged downwardly in a rotational motion at the lower end of a drill string. The drill bit includes bit teeth that scrape or crush the surrounding rock to form the wellbore. As the wellbore is formed, small pieces of crushed rock, referred to as "drill cuttings," are left behind within the wellbore. Simultaneously, a drilling fluid, sometimes referred to as "drilling mud," is pumped through the drill string to the drill bit to provide lubrication for the drill bit. The circulating drilling fluid also carries the drill cuttings produced by the drill bit to the surface via the annulus formed between the drill string and the wellbore.

The density of the drilling fluid is closely monitored and controlled to optimize the drilling operation, to prevent the wellbore from collapsing, to ensure formation pressures are properly controlled, and to control the rate of penetration of the drill bit. Moreover, because drilling fluid often contains expensive synthetic oil-based lubricants, the drilling fluid is typically recovered, processed, and reused. The first step of drilling fluid processing generally includes removing the solids (e.g., the drill cuttings) from the drilling fluid. This is typically accomplished using a vibratory separator, such as a "shale shaker." Additional processing equipment, such as centrifuges and hydrocyclones, may also be used to further clean the drilling fluid. The resulting drill cuttings may then be processed to remove residues and contaminants, before being disposed of in a landfill or exported for various industrial uses.

A vibratory separator is a device used to remove drill cuttings from drilling fluid. Typically, the vibratory separator is a dual-motor, high-frequency machine that provides fine particle separation via one or more screens that vibrate in a linear or elliptical motion. Drilling fluid is introduced through a feeder, which typically includes a header tank or box. The feeder evenly distributes the drilling fluid across the entire width of the screen frame. The hopper, which is attached to the underside of the machine, captures the liquid underflow passing through the screen bed.

The term "G-force" refers to the acceleration of an object relative to the acceleration of gravity. In general, a higher G-force acting on the screens of the vibratory separator results in a higher degree of liquid/solids separation, because more liquid flows down into the hopper. Therefore, the motors are typically attached directly to the screen frame and are positioned over the screen bed to maximize the amount of G-force transferred to the screen surfaces, while springs or float mounts are used to isolate the vibratory motion of the screen frame from the surrounding support structure.

Each vibratory separator has a known manufacturer-measured G-force, which is obtained by measuring the G-force on the screens functioning in air (e.g., with no fluid circulating through the vibratory separator). Sometimes, manufacturers also provide a second, lower G-force that is measured while water circulates through the vibratory separator at a certain flow rate. However, in operation, the G-force varies depending on the relative densities of the liquid and the solids within the circulating drilling fluid. Moreover, because the density of the drilling fluid has a direct impact on the drilling operation, there exists a long-standing need for efficient techniques for identifying downhole conditions during drilling operations using vibratory separators.

One technique for managing vibratory separator G-force variations is provided by U.S. Pat. No. 9,199,278 B2 to Scott et al., entitled "Apparatus and Method for Separating Solids from a Solids Laden Drilling Fluid". The technique described therein involves constantly measuring the G-force acting on the vibratory separator, and automatically adjusting the G-force during varying liquid/solids loading conditions. More specifically, the technology utilizes an accelerometer sensor capable of measuring the separator's vibration and, consequently, the separator's G-force. The drive speed is then automatically adjusted based on the mass (i.e. the amount of liquid versus solids), that is present on the screens. This, in turn, allows the vibratory separator to automatically increase or decrease the G-force depending on the liquid/solids loading conditions. However, while this technology provides for the automatic increase or decrease of a vibratory separator's G-force to handle varying liquid/solids loading conditions, it does not provide any means for identifying downhole conditions using the vibratory separator.

SUMMARY

An embodiment described herein provides a method for identifying a downhole condition during a drilling operation using a vibratory separator. The method includes calibrating, via a computing device, a sensor system attached to a vibratory separator by using the sensor system to periodically measure a G-force acting on the vibratory separator functioning under steady-state operating parameters, wherein the steady-state operating parameters include a steady-state flow rate and a steady-state rate of penetration (ROP) for a drilling operation. The method also includes determining a relationship between the G-force acting on the vibratory separator and a flow rate and an ROP for the drilling operation by using the sensor system to measure the G-force acting on the vibratory separator functioning under a number of non-steady-state operating parameters. The method also includes determining an expected total basket weight for each G-force measurement using the relationship between the G-force and the flow rate and the ROP, and monitoring a current total basket weight of the vibratory separator functioning under current operating parameters by using the sensor system to periodically measure the current total basket weight, wherein the current operating parameters include a current flow rate and a current ROP. The method further includes identifying a downhole condition if the current total basket weight is greater or less than the expected total basket weight for the current operating parameters.

In some embodiments, identifying the downhole condition includes identifying a hole cleaning problem if the current total basket weight is less than the expected total basket weight for the current operating parameters or identifying a wellbore instability problem if the current total basket weight is greater than the expected total basket weight for the current operating parameters. In some embodiments, the method also includes determining an amount of missing or excess drill cuttings based a difference between the current total basket weight and the expected total basket weight for the current operating parameters. In such embodiments, the method may further include receiving, at the computing device, images of one or more screens of the vibratory separator captured by a high-definition camera, and analyzing drill cuttings loading and discharge based on the amount of missing or excess drill cuttings and the images of the one or more screens.

In some embodiments, determining the relationship between the G-force and the flow rate and the ROP by using the sensor system to measure the G-force acting on the vibratory separator functioning under the number of non-steady-state operating parameters includes: (1) using the sensor system to measure the G-force after each of a predetermined number of incremental ROP reductions from the steady-state ROP; (2) using the sensor system to measure the G-force after each of a predetermined number of incremental flow rate reductions from the steady-state flow rate; (3) using the sensor system to measure the G-force after each of a predetermined number of incremental ROP increases from the steady-state ROP; and (4) using the sensor system to measure the G-force after each of a predetermined number of incremental flow rate increases from the steady-state flow rate. Furthermore, in some embodiments, the method includes determining the relationship between the G-force and the flow rate and the ROP by using the G-force measurements to create a 3-axis nomogram for the G-force versus the flow rate versus the ROP.

In some embodiments, the method includes monitoring an acoustic fingerprint of the vibratory separator by using the sensor system to periodically measure acoustic signals emanating from the vibratory separator, and using the acoustic fingerprint to augment the G-force measurements obtained by the vibratory separator. Moreover, in some embodiments, the method includes monitoring a weight of a basket of the vibratory separator using a cuttings scale, and using the weight of the basket to augment the G-force measurements obtained by the vibratory separator.

Another embodiment described herein provides a computing system including a processor and a non-transitory, computer-readable storage medium. The non-transitory, computer-readable storage medium includes code configured to direct the processor to calibrate a sensor system attached to a vibratory separator by using the sensor system to periodically measure a G-force acting on the vibratory separator functioning under steady-state operating parameters, wherein the steady-state operating parameters include a steady-state flow rate and a steady-state ROP for a drilling operation. The non-transitory, computer-readable storage medium also includes code configured to direct the processor to determine a relationship between the G-force acting on the vibratory separator and a flow rate and an ROP for the drilling operation by using the sensor system to measure the G-force acting on the vibratory separator functioning under a number of non-steady-state operating parameters. The non-transitory, computer-readable storage medium also includes code configured to direct the processor to determine an expected total basket weight for each G-force measurement using the relationship between the G-force and the flow rate and the ROP, and monitor a current total basket weight of the vibratory separator functioning under current operating parameters by using the sensor system to periodically measure the current total basket weight, wherein the current operating parameters include a current flow rate and a current ROP. The non-transitory, computer-readable storage medium further includes code configured to direct the processor to identify a downhole condition if the current total basket weight is greater or less than the expected total basket weight for the current operating parameters.

In some embodiments, the downhole condition includes a hole cleaning problem if the current total basket weight is less than the expected total basket weight for the current operating parameters or a wellbore instability problem if the current total basket weight is greater than the expected total basket weight for the current operating parameters. In some embodiments, the non-transitory, computer-readable storage medium includes code configured to direct the processor to determine an amount of missing or excess drill cuttings based a difference between the current total basket weight and the expected total basket weight for the current operating parameters. In such embodiments, the non-transitory, computer-readable storage medium may also include code configured to direct the processor to receive images of one or more screens of the vibratory separator captured by a high-definition camera and analyze drill cuttings loading and discharge based on the amount of missing or excess drill cuttings and the images of the one or more screens.

In some embodiments, the non-transitory, computer-readable storage medium includes code configured to direct the processor to determine the relationship between the G-force and the flow rate and the ROP by: (1) using the sensor system to measure the G-force after each of a predetermined number of incremental ROP reductions from the steady-state ROP; (2) using the sensor system to measure the G-force after each of a predetermined number of incremental flow rate reductions from the steady-state flow rate; (3) using the sensor system to measure the G-force after each of a predetermined number of incremental ROP increases from the steady-state ROP; and (4) using the sensor system to measure the G-force after each of a predetermined number of incremental flow rate increases from the steady-state flow rate. Furthermore, in some embodiments, the non-transitory, computer-readable storage medium includes code configured to direct the processor to determine the relationship between the G-force and the flow rate and the ROP by using the G-force measurements to create a 3-axis nomogram for the G-force versus the flow rate versus the ROP.

In some embodiments, the non-transitory, computer-readable storage medium includes code configured to direct the processor to monitor an acoustic fingerprint of the vibratory separator by using the sensor system to periodically measure acoustic signals emanating from the vibratory separator, as well as to use the acoustic fingerprint to augment the G-force measurements obtained by the vibratory separator. Moreover, in some embodiments, the non-transitory, computer-readable storage medium includes code configured to direct the processor to monitor a weight of a basket of the vibratory separator using a cuttings scale, as well as to use the weight of the basket to augment the G-force measurements obtained by the vibratory separator.

Another embodiment described herein provides a non-transitory, computer-readable storage medium. The non-transitory, computer-readable storage medium includes program instructions that are executable by a processor to cause the processor to calibrate a sensor system attached to a vibratory separator by using the sensor system to periodically measure a G-force acting on the vibratory separator functioning under steady-state operating parameters, wherein the steady-state operating parameters include a steady-state flow rate and a steady-state ROP for a drilling operation. The program instructions are also executable by the processor to cause the processor to determine a relationship between the G-force acting on the vibratory separator and a flow rate and an ROP of the drilling operation by using the sensor system to measure the G-force acting on the vibratory separator functioning under a number of non-steady-state operating parameters. The program instructions are further executable by the processor to cause the processor to determine an expected total basket weight for each G-force measurement using the relationship between the G-force and the flow rate and the ROP, monitor a current total basket weight of the vibratory separator functioning under current operating parameters by using the sensor system to periodically measure the current total basket weight, wherein the current operating parameters include a current flow rate and a current ROP, and identify a downhole condition if the current total basket weight is greater or less than the expected total basket weight for the current operating parameters.

In some embodiments, the downhole condition includes a hole cleaning problem if the current total basket weight is less than the expected total basket weight for the current operating parameters or a wellbore instability problem if the current total basket weight is greater than the expected total basket weight for the current operating parameters. In some embodiments, the program instructions are also executable by the processor to cause the processor to determine an amount of missing or excess drill cuttings based a difference between the current total basket weight and the expected total basket weight for the current operating parameters. In such embodiments, the program instructions may be further executable by the processor to cause the processor to receive images of one or more screens of the vibratory separator captured by a high-definition camera and analyze drill cuttings loading and discharge based on the amount of missing or excess drill cuttings and the images of the one or more screens. Furthermore, in some embodiments, the program instructions are executable by the processor to cause the processor to determine the relationship between the G-force and the flow rate and the ROP by using the G-force measurements to create a 3-axis nomogram for the G-force versus the flow rate versus the ROP.

In some embodiments, the program instructions are executable by the processor to cause the processor to monitor an acoustic fingerprint of the vibratory separator by using the sensor system to periodically measure acoustic signals emanating from the vibratory separator, as well as to use the acoustic fingerprint to augment the G-force measurements obtained by the vibratory separator. Moreover, in some embodiments, the program instructions are executable by the processor to cause the processor to monitor a weight of a basket of the vibratory separator using a cuttings scale, as well as to use the weight of the basket to augment the G-force measurements obtained by the vibratory separator.

DESCRIPTION OF THE DRAWINGS

Advantages of the present techniques may become apparent upon reviewing the following detailed description and drawings of non-limiting examples in which.

Figure 1:
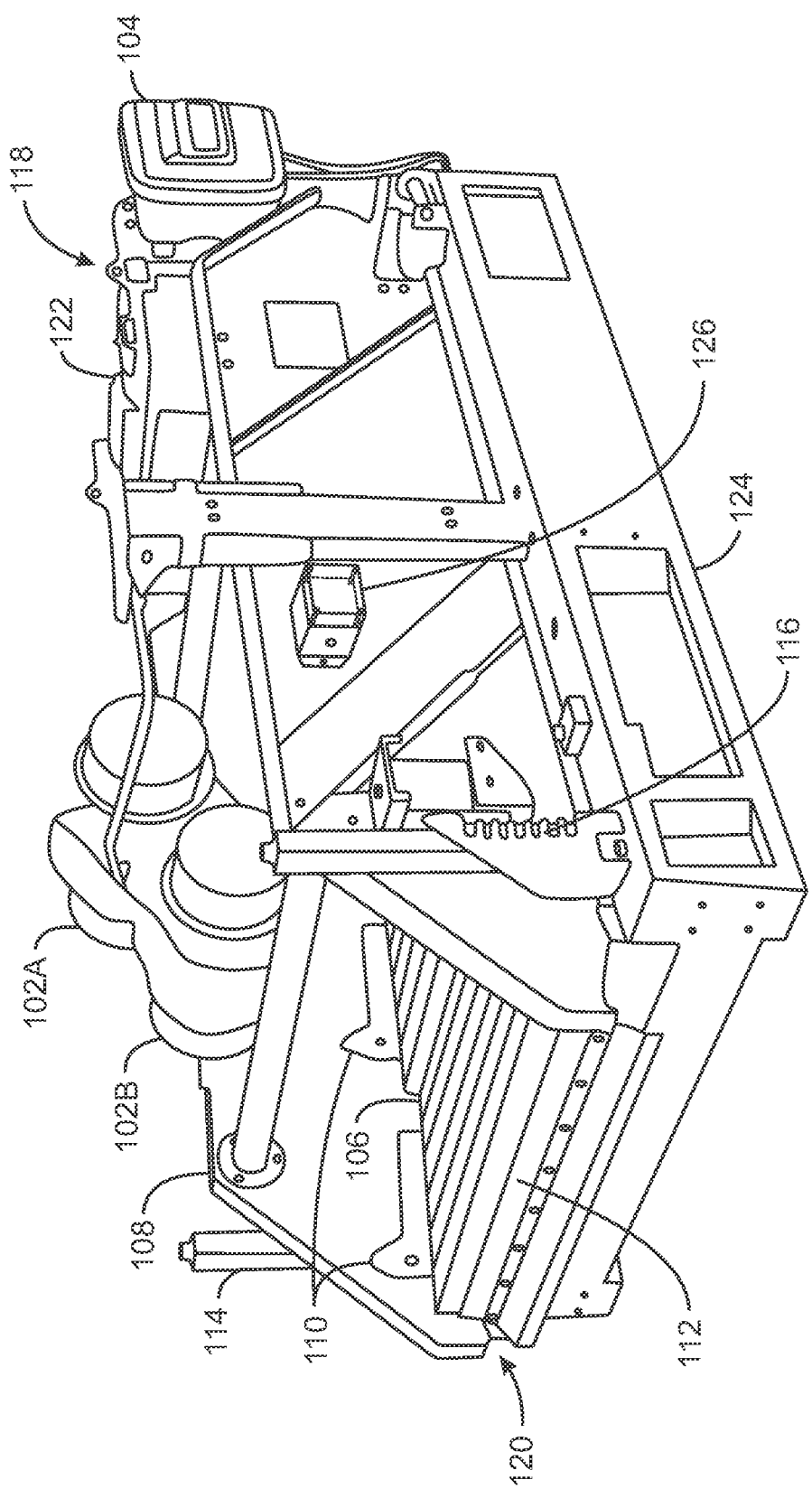
FIG. 1 is a perspective view of an exemplary vibratory separator that may be utilized according to embodiments described herein.

It should be noted that the figures are merely examples of the present techniques and are not intended to impose limitations on the scope of the present techniques. Further, the figures are generally not drawn to scale, but are drafted for purposes of convenience and clarity in illustrating various aspects of the techniques.

DETAILED DESCRIPTION

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the terms "a" and "an" mean one or more when applied to any embodiment described herein. The use of "a" and "an" does not limit the meaning to a single feature unless such a limit is specifically stated.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "configured" means that the element, component, or other subject matter is designed and/or intended to perform a given function. Thus, the use of the term "configured" should not be construed to mean that a given element, component, or other subject matter is simply "capable of" performing a given function but that the element, component, and/or other subject matter is specifically selected, created, implemented, utilized, and/or designed for the purpose of performing the function.

The term "drill cuttings" (or simply "cuttings") refers small pieces of rock that break away from the formation during the drilling of a wellbore.

The term "drilling fluid" (or "drilling mud") refers to any of various mixtures of natural clays and polymers, weighting agents, and other materials suspended in water or a petroleum material. Drilling fluid aids the drilling of a wellbore through a formation by performing various functions. For example, the drilling fluid provides lubrication for the drill bit, carries the drill cuttings produced by the drill bit to the surface, helps prevent the wellbore from collapsing prior to completion, ensures formation pressures are properly controlled, and helps control the rate of penetration of the drill bit.

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure or method is not intended to be limiting, required, or exclusive/exhaustive; and other components, features, structures, or methods, including structurally and/or functionally similar and/or equivalent components, features, structures, or methods, are also within the scope of the present techniques.

As used herein, the term "flow rate" refers to the rate (e.g., in gallons per minute) at which drilling fluid is circulating out of a wellbore during a drilling operation, and then flowing through one or more vibratory separators as part of a drilling fluid processing operation.

As used herein, the term "fluid" refers to gases, liquids, and combinations of gases and liquids, as well as to combinations of gases and solids, and combinations of liquids and solids.

The term "G-force" (or "G-factor") refers to the gravitational force equivalent. More specifically, the term "G-force" refers to the acceleration of an object relative to the acceleration of gravity, with a G-force of 1 G equal to the conventional value of gravitational acceleration on Earth, which is 9.8 meters per second squared (m/s$^2$).

As used herein, the term "periodically" is used to describe a function that is performed at predetermined time intervals. In some embodiments, the predetermined time interval is on the order of seconds or minutes. In other embodiments, the predetermined time interval is on the order of fractions of a second.

The term "rate of penetration" (ROP) refers to the speed (e.g., in feet per hour or meters per hour) at which the drill bit breaks through rock and, thus, deepens the wellbore.

As used herein, the term "vibratory separator" refers to a vibrating screen machine that is designed for fine particle separation. More particularly, according to embodiments described herein, the term "vibratory separator" refers to a vibrating screen machine that is designed to remove drill cuttings from drilling fluid. Vibratory separators used for this purpose are sometimes referred to as "shale shakers."

The term "wellbore" refers to a hole drilled vertically, at least in part, and may also refer to a hole drilled with one or more deviated, highly deviated, and/or lateral sections.

The term "hydrocarbon well" includes the wellbore itself, as well as the wellhead, casing strings, and other equipment that is typically associated with the extraction of hydrocarbons from a formation.

Overview

Embodiments described herein provide techniques for identifying downhole conditions during a drilling operation using a vibratory separator that includes a sensor system (and, optionally, a high-definition camera). In some embodiments, the sensor system is an industrial, Internet of Things (IoT) sensor system that includes one or more motion sensors (and, optionally, one or more acoustic sensors). According to embodiments described herein, the integration of this sensor system into a vibratory separator provides a mechanism for the direct, real-time measurement of the G-force acting on the vibratory separator. Moreover, in various embodiments, the resulting data, in combination with data relating to the overall drilling operation and the specifications of the vibratory separator itself, can be utilized to provide for the dynamic identification and analysis of downhole conditions. For example, such data can be used to provide qualitative assessments regarding wellbore stability and the degree of hole cleaning that is being achieved. Moreover, under steady-state operating parameters, such data can be used to provide quantitative measurements of the amount of excess or missing drill cuttings mass at the surface. This information, in turn, allows for the optimization of the overall drilling operation, such as in the form of early intervention measures that address deteriorating downhole conditions.

Exemplary Vibratory Separator Including Sensor System

FIG. 1 is a perspective view of an exemplary vibratory separator 100 that may be utilized according to embodiments described herein. In various embodiments, the vibratory separator 100 is a dual-motor, high-frequency machine that provides fine particle separation between a drilling fluid and drill cuttings that are circulating within the drilling fluid. Specifically, the vibratory separator 100 include two motors 102A and 102B that are controlled via a control panel 104 of the vibratory separator 100. As may be appreciated, other embodiments of the vibratory separator 100 may include one motor, three motors and/or any number of motors in other configurations. When in operation, the motors 102A and 102B cause one or more screens 106 to vibrate in a linear or elliptical motion.

The vibratory separator 100 includes screen wedges 110 that are used to securely attach the one or more screens 106 to the inside of a basket 108 of the vibratory separator 100, as well as screen gaskets 112 that provide a tight seal between the basket 108 and the one or more screens 106. Moreover, in some embodiments, the vibratory separator 100 includes a basket angle adjuster 114, as well as a basket angle indicator 116 showing the current basket angle, which is typically between −3° and +3°.

The vibratory separator 100 includes a feed end 118 and a discharge end 120. At the feed end 118, drilling fluid is introduced into the vibratory separator 100 via a header tank (or box) 122. The header tank 122 is configured to evenly distribute the drilling fluid across the entire width of the screen frame. Once the drilling fluid has been distributed across the screen frame, the vibration of the screen frame causes the drilling fluid to pass through the screen bed and into a hopper 124, which is attached to the underside of the vibratory separator 100. The recovered drilling fluid is then sent to downstream equipment for further processing. Simultaneously, the drill cuttings and other large particles remaining on top of the screen frame exit the vibratory separator 100 at the discharge end 120.

In various embodiments, the vibratory separator 100 has a known manufacturer-measured G-force, which is obtained by measuring the G-force on the screens 106 functioning in air, i.e., with no drilling fluid circulating through the vibratory separator 100. In some embodiments, manufacturers also provide a second, lower G-force that is measured while water circulates through the vibratory separator 100 at a certain flow rate. However, in operation, the G-force varies depending on the relative densities of the liquid and the solids within the circulating drilling fluid. In general, a higher G-force acting on the screens 106 results in a higher degree of liquid/solids separation, because more liquid flows down into the hopper 124. Therefore, the motors 102A and 102B are typically attached directly to the screen frame and are positioned over the screen bed to maximize the amount of G-force transferred to the screen surfaces, while springs or float mounts are used to isolate the vibratory motion of the screen frame from the surrounding support structure.

As described herein, there exists a long-standing need for efficient techniques for identifying fluctuating downhole conditions during drilling operations. Therefore, embodiments described herein provide techniques for using one or more vibratory separators, such as the vibratory separator 100, to identify and analyze downhole conditions relating to a wellbore drilling operation. According to embodiments described herein, this is achieved by including a sensor system 126 within the vibratory separator 100. Specifically, the sensor system 126 is used to analyze the drilling fluid passing through the vibratory separator 100 via the direct, real-time measurement of the G-force acting on the screens 106 of the vibratory separator 100. In various embodiments, such G-force measurements can be used to determine whether the drilling fluid includes a smaller amount of drill cuttings than expected, which indicates a possible hole cleaning problem, or includes a larger amount of drill cuttings than expected, which indicates a possible wellbore instability dysfunction. In some embodiments, the G-force measurements can also provide information about other potential downhole conditions during the drilling operation, such as a possible lost circulation event. Further, if two or more vibratory separators are utilized in a system, the sensor system 126 may be used to collect and process the data from one or more of the vibratory separators to provide the indication of a potential downhole condition, such as a potential wellbore instability dysfunction, hole cleaning problem and/or lost circulation event.

In various embodiments, the sensor system 126 is an industrial, Internet of Things (IoT) sensor system that includes one or more motion sensors (and, optionally, one or more acoustic sensors). The motion sensors may include a gyroscope, an accelerometer, and/or a magnetometer, for example, that provide motion information relating to the vibration, orientation, and/or magnetic field in the vicinity of the screens 106. The acoustic sensors may include one or more piezoelectric MEMS microphones with an acoustic sample rate of up to 100 kilohertz (kHz). The sensor system 126 may include on-board memory in the form of, for example, non-volatile flash memory. In some embodiments, the sensor system 126 is powered by batteries, such as, for example, one or more replaceable D-Cell 19 amp-hour lithium metal batteries. The sensor system 126 may also be configured for various communication techniques, such as Bluetooth and/or Wi-Fi communications, and may include updatable firmware and configuration parameters that can be updated locally over Bluetooth via a mobile device or remotely over Wi-Fi, for example. As shown in FIG. 1, the sensor system 126 may be attached to the outside of the basket 108 of the vibratory separator 100, such as via pin connectors (e.g., an external 7-pin connector), and may be protected by a water-resistant polycarbonate enclosure, for example. Moreover, it is to be understood that the sensor system 126 may also be any other suitable type of sensor system that is capable of measuring the G-force acting on the screens 106.

In various embodiments, the sensor system 126 transmits sensor data to one or more remote computing devices (not shown), such as via Bluetooth or Wi-Fi. In some embodiments, the sensor data is sent to a remote computing device that is configured to control the operation of the sensor system 126. In such embodiments, the remote computing device may control the operation of the sensor system 126 such that appropriate sensor data is obtained according to embodiments described herein.

While embodiments are described herein with respect to the use of G-force measurements for identifying downhole conditions, in some embodiments, acoustic data obtained by the sensor system 126 may additionally or alternatively be used to identify downhole conditions. Specifically, the vibratory separator 100 emits a specific acoustic fingerprint during normal operation. The acoustic fingerprint represents particular boundaries or ranges of acoustic signals that are generated by the vibratory separator 100 functioning under specific operating parameters. Therefore, detected changes in the acoustic fingerprint can be used to analyze the characteristics of the liquid/solids loading conditions of the vibratory separator 100. For example, if the sensor system 126 detects a dampening of the sound being emitted by the vibratory separator 100, that may be an indication that the basket weight of the vibratory separator 100 has increased. On the other hand, if the sensor system 126 detects an amplification of the sound being emitted by the vibratory separator 100, that may be an indication that the basket weight of the vibratory separator 100 has decreased. Similarly, if the sound being emitted by the vibratory separator 100 undergoes a change in pitch, the change in pitch may be analyzed to determine whether the vibratory separator 100 is still functioning correctly. In this manner, detected changes in the acoustic fingerprint are used to augment the G-force measurements obtained by the vibratory separator 100 and, thus, enhance the overall process.

Figure 2:
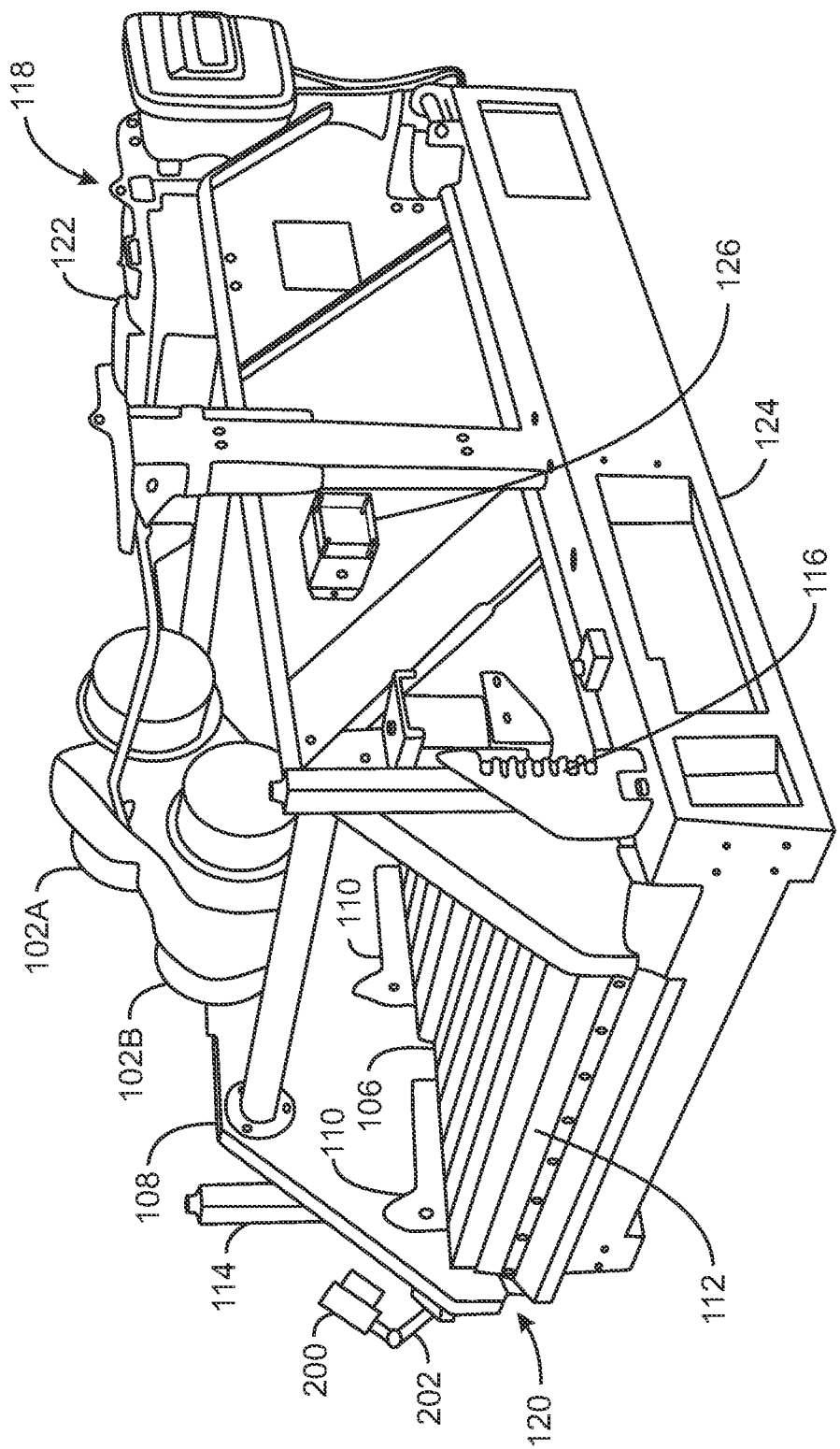
FIG. 2 is a perspective view of the exemplary vibratory separator of FIG. 1 with the addition of a high-definition camera that may be utilized according to embodiments described herein.

FIG. 2 is a perspective view of the exemplary vibratory separator 100 of FIG. 1 with the addition of a high-definition camera 200 that may be utilized according to embodiments described herein. Like numbered items are as described with respect to FIG. 1. In various embodiments, the high-definition camera 200 is used to provide additional information regarding the characteristics of the drill cuttings exiting the vibratory separator 100 via the screen bed. Therefore, the high-definition camera 200 is positioned such that it captures images of the drill cuttings exiting the vibratory separator 100 via the screen bed. As shown in FIG. 2, in some embodiments, this is accomplished by mounting the high-definition camera 200 to the side of the discharge end 120 of the vibratory separator 100 via a tripod attachment 202. However, it is to be understood that the high-definition camera 200 may be attached to any suitable surface in any suitable manner, so long as the high-definition camera 200 is configured to capture images of the drill cuttings exiting the vibratory separator 100 via the screen bed.

In various embodiments, the high-definition camera 200 is used to determine the amount of drill cuttings exiting the vibratory separator 100, as well as the shape and size of the drill cuttings. This information can be used alone, or in combination with known drilling waste volume methodologies, for determining the exact volume of the wet drill cuttings, as well as for analyzing the overall drill cuttings loading and discharge for the vibratory separator 100. For example, in some embodiments, known wellbore-stability methodologies for classifying the cuttings type(s) (e.g., Type I, II, and/or II) may be used, where each cuttings type is directly correlated to one or more specific downhole conditions or dysfunctions.

In some embodiments, the high-definition camera 200 is a computer-vision camera that is paired with corresponding computer-vision software on the remote computing device. The computer-vision software may use the images captured by the high-definition camera 200 to provide alerts when image trends change, such as, for example, when more or less drill cuttings are detected on the screen bed. Moreover, in some embodiments, multiple high-definition cameras are used to provide more detailed information regarding the performance of the vibratory separator 100 based on images captured at multiple different positions and angles.

In some embodiments, a cuttings scale (not shown) is added to the vibratory separator 100. For example, the cuttings scale may be integrated into the basket 108 of the vibratory separator 100. Information provided by the cuttings scale may optionally be combined with the G-force data and the images captured by the high-definition camera 200 to assist with the calibration of the vibratory separator 100 and/or to provide detailed information regarding the qualities of the drill cuttings exiting the vibratory separator 100. Similarly to the sensor system 126, the cuttings scale may be configured for Bluetooth and/or Wi-Fi communications, in which case the cuttings scale may send data directly to the remote computing device(s). Alternatively, the cuttings scale may be communicably coupled to the sensor system 126, thus providing a mechanism for the sensor system 126 to transmit or send combined data from the sensor system 126 and the cuttings scale to the remote computing device(s). Furthermore, in some embodiments, any number of additional sensors (or sensor systems) may be attached to the vibratory separator 100 (and/or to any associated upstream and/or downstream equipment) to provide additional information regarding the operation of the vibratory separator 100 and the qualities of the recovered drill cuttings.

The schematic views of FIGS. 1 and 2 are not intended to indicate that the vibratory separator 100 is to include all of the components shown in FIGS. 1 and 2, or that the vibratory separator 100 is limited to only the components shown in FIGS. 1 and 2. Rather, any number of components may be omitted from the vibratory separator 100, or added to the vibratory separator 100, depending on the details of the specific implementation. Moreover, embodiments described herein are not limited to the type of vibratory separators depicted in FIGS. 1 and 2. Rather, the wellbore analysis techniques described herein may be implemented using any suitable type of vibratory separation device.

Furthermore, in operation, a drilling operation typically includes around three (3) to eight (8) vibratory separators working in series to process the drilling fluid exiting the wellbore. According to embodiments described herein, each vibratory separator may initially function as a stand-alone unit to allow for the calibration of the sensor system attached to each vibratory separator. This may be particularly useful for instances in which each vibratory separator has slightly different mud distribution properties. However, as the drilling operation progresses, the remote computing device may combine the sensor data obtained from the vibratory separators to provide a more comprehensive assessment of the overall efficiency of the drilling operation, as well as more detailed information regarding a potential downhole condition. Moreover, in some embodiments, the remote computing device is configured to autonomously monitor the sensor data received from the sensor systems, either alone or in combination, and to provide automatic user feedback in the event that a problem is detected.

Figure 3A:
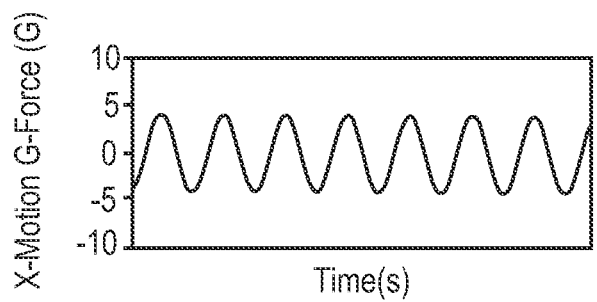
FIGS. 3A, 3B, and 3C include three graphs showing experimental results of vibrational data recorded by a sensor system that is attached to a vibratory separator.
Figure 3B:
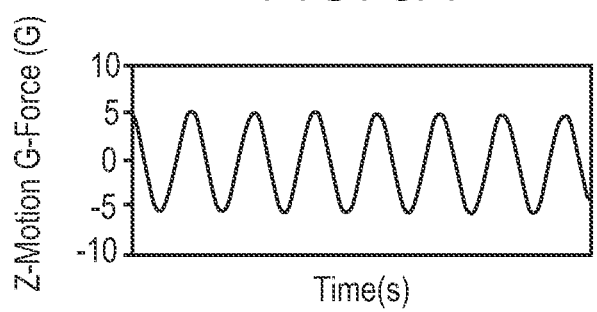
Figure 3C:
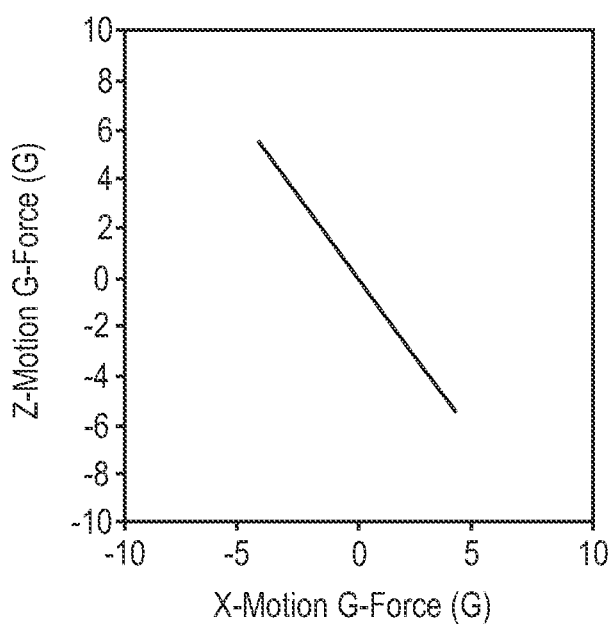

FIGS. 3A, 3B and 3C respectively include three graphs 300, 302, and 304 showing experimental results of vibrational data recorded by a sensor system that is attached to a vibratory separator. Specifically, FIGS. 3A, 3B, and 3C show an X-motion graph 300, a Z-motion graph 302, and an X- vs. Z-motion graph 304, respectively, with the vibratory separator functioning at a motor velocity of 1778 rotations per minute (RPM). The first graph 300 shows G-force variations that are caused by X-motion vibrations (i.e., planar or "side-to-side" vibrations) of the separator's basket over time. In this example, the amplitude of the X-motion vibrations is 0.094 inches, and the standard G-force is 4.2 G. The second graph 302 shows G-force variations that are caused by Z-motion vibrations (i.e., vertical or "up-and-down" vibrations) of the separator's basket over time. In this example, the amplitude of the Z-motion vibrations is 0.122 inches, and the standard G-force is 5.5 G. The third graph 304 shows a comparison of the G-force variations that are caused by X-motion vibrations (shown on the x-axis) and the G-force variations that are caused by the Z-motion vibrations (shown on the y-axis). As shown in the third graph 304, the comparison of the vibrations in both directions reveals an overall vibration angle of 52.3°, with a total measured G-force of 6.9 G.

Figure 4A:
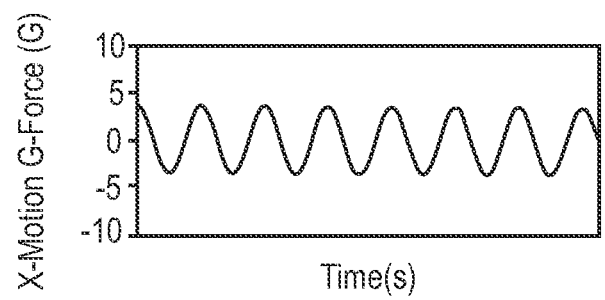
FIGS. 4A, 4B, and 4C include three graphs showing experimental results of vibrational data recorded by the sensor system with the vibratory separator functioning at a different motor velocity.
Figure 4B:
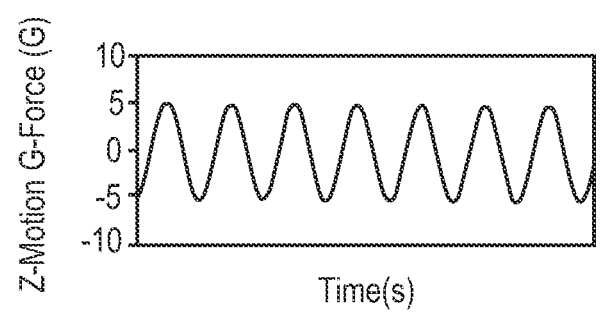
Figure 4C:
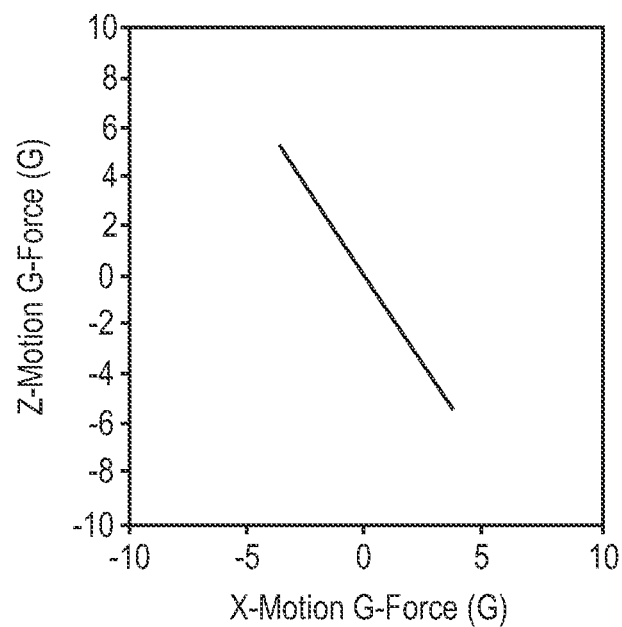

FIGS. 4A, 4B and 4C respectively include three graphs 400, 402, and 404 showing experimental results of vibrational data recorded by the sensor system with the vibratory separator functioning at a different motor velocity. Similarly, FIGS. 4A, 4B, and 4C show an X-motion graph 400, a Z-motion graph 402, and an X- vs. Z-motion graph 404, respectively, with the vibratory separator functioning at a motor velocity of 1739 RPM. The first graph 400 shows G-force variations that are caused by X-motion vibrations of the separator's basket over time. In this example, the amplitude of the X-motion vibrations is 0.085 inches, and the standard G-force is 3.7 G. The second graph 402 shows G-force variations that are caused by Z-motion vibrations of the separator's basket over time. In this example, the amplitude of the Z-motion vibrations is 0.122 inches, and the standard G-force is 5.2 G. The third graph 404 shows a comparison of the G-force variations that are caused by X-motion vibrations (shown on the x-axis) and the G-force variations that are caused by the Z-motion vibrations (shown on the y-axis). As shown in the third graph 404, the comparison of the vibrations in both directions reveals an overall vibration angle of 55.0°, with a total measured G-force of 6.4 G.

Exemplary Implementation of the Wellbore Analysis Techniques Described Herein

In general, there are two methods for calculating the G-force acting on a vibratory separator. These two methods are shown below in equations (Eq. 1) and (Eq. 2), $$G\text{-force} = \frac{(\text{Stroke Length in inches})(RPM^2)}{70{,}490} \quad (\text{Eq. 1})$$

$$G\text{-force} = \quad (\text{Eq. 2})$$
$$\text{Motor Moment (in force lb)} \div \text{Total Basket Weight (in lb)}$$

where Stroke Length is a predetermined distance based on the components of the vibratory separator (e.g., combination of the lateral and vertical forces or half a revolution of the motor shaft), Motor Moment is a predetermined value based on the components of the vibratory separator, and Total Basket Weight is a predetermined value based on the components of the vibratory separator.

For either method, the heavier the basket of the vibratory separator, the lower the G-force acting on the vibratory separator. Specifically, a heavier basket reduces the stroke length for a constant motor RPM in the first method, while the second method is directly dependent on the basket weight. As described herein, a vibratory separator may have a manufacturer-measured G-force with the screens installed on the basket and functioning in air (e.g., with no liquid circulating within the vibratory separator). Sometimes, the manufacturer also provides a second, lower G-force that is measured with water circulating at a certain flow rate within the vibratory separator, which creates a certain screen coverage and pool depth. However, during the drilling operation (e.g., when drilling fluid is circulating through the vibratory separator), the basket is covered with both drilling fluid (of a certain density) and wet drill cuttings (of a higher density). Therefore, the total weight on the basket is now as follows: Total Basket Weight=Basket Weight+Screens Weight+Fluid Volume Weight+Drill Cuttings Weight. This larger weight value lowers the G-force even more.

When a drilling operation is proceeding under steady-state operating parameters, the flow rate, rate of penetration (ROP), drilling assembly rotations per minute (RPM), drilling fluid density (also referred to as "mud weight"), and vibratory separator screen size remain constant. Therefore, under such steady-state operating parameters, any change in basket weight may result from more or less drill cuttings mass reaching the surface. As a result, according to embodiments described herein, the direct and constant measurement of the G-force acting on the vibratory separator basket is used to identify and analyze downhole conditions relating to the drilling operation. Specifically, measuring the G-force in this manner can provide a qualitative assessment of the degree of wellbore instability and/or hole cleaning. In addition, under steady-state operating parameters, measuring the G-force in this manner can provide a quantitative measurement of the amount of excess or missing drill cuttings mass at surface.

As may be appreciated, various modifications may be made to further enhance the operations and/or the system. In some embodiments, other sensors or sensing devices may be used in addition to the G-force measurements to provide verification of the measurements or separately as another measurement control. For example, the G-force measurements may be further augmented by using a high-definition camera, acoustic sensors and/or a cuttings scale to analyze the drill cuttings exiting the vibratory separator. These additional sensors may be used as additional verifications of the G-force measurements.

As one exemplary implementation of the wellbore analysis techniques described herein, an exemplary vibratory separator with a live basket weight (e.g., the weight of the basket plus the screens in air) of 2,005 pounds (lb) is utilized. The exemplary vibratory separator generates, with no flow, a G-force of 7.3 G. Assuming a flow rate of 900 gallons per minute (gpm) of 12 pounds per gallon (ppg) drilling fluid, equally distributed over a system including three vibratory separators, each vibratory separator receives 300 gpm of drilling fluid. At 12 ppg, 300 gallons of drilling fluid weighs 3,600 lb. This is the dynamic weight of the drilling fluid passing through the screens of the vibratory separator during a one-minute time period. Assuming that the drilling operation is progressing at an ROP of 100 feet/hour (ft/hr) (or 1.67 feet/minute (ft/min)) in a 12.25 inch hole, and assuming a 5% enlargement of the hole to a total of 12.86 inches (e.g., 12.25 times 1.05), the expected volume of the drill cuttings is as shown in equation (Eq. 3), where the barrels of rock per minute (bbl rock/min) is equal to [(Outer Diameter of the Hole in inches)$^2$/1029]×(ROP in ft/min).

$$\frac{12.86^2}{1029} \times 1.67 = 0.26 \text{ bbl rock/min} \quad (\text{Eq. 3})$$

Moreover, assuming a specific gravity (SG) of drill cuttings of 2.6 SG or 21.68 ppg, the weight of the drill cuttings is 236.7 lb (e.g., 21.68 ppg×0.26 bbl rock/min×42 gallons/bbl). Therefore, the total basket weight under the given, steady-state operating parameters is as follows: 2,005 lb+3,600 lb+236.7 lb=5,841.7 lb. In other words, under these steady-state operating parameters, the screens of the vibratory separator are expected to be exposed to a total mass of 5,841.7 lb per unit time (e.g., per minute in this example).

Under these steady-state operating parameters, the sensor system is then used to measure the G-force acting on the vibratory separator. For the above steady-state operating parameters, assume that the new G-force measurement is 6.5 G. Next, the ROP is reduced in predetermined increments, and the new G-force is measured after each incremental reduction. For example, the ROP may be reduced in 10 ft/hr increments, (e.g., to 90 ft/hr, 80 ft/hr, etc.), for a certain number of increments. In general, the G-force increases as the ROP decreases. When this is complete, the ROP is returned to the steady-state operating parameter (e.g., to 100 ft/hr in this example), and the flow rate is then reduced in predetermined increments, with the new G-force being measured after each incremental reduction. For example, the flow rate may be reduced in 100 gpm increments for a certain number of increments. In general, the G-force should increase as the flow rate decreases.

The G-force measurements that are obtained using these two parameter variations are then used to determine the relationship between the G-force, the ROP, and the flow rate. In various embodiments, this is accomplished by creating a 3-axis nomogram of ROP versus flow rate versus G-force.

In some embodiments, the ROP is then increased in the same predetermined increments, and the new G-force is measured after each incremental increase. In addition, in such embodiments, the flow rate is increased in the same predetermined increments, and the new G-force is measured after each incremental increase. In various embodiments, this allows for the expansion of the nomogram (or other relationship between the G-force, the ROP, and the flow rate).

In various embodiments, the relationship between the G-force, the ROP, and the flow rate (e.g., in the form of the nomogram) is used to assign a total basket weight to every G-force measurement. The total basket weight may then be used to directly calculate the expected drill cuttings weight before screen separation. Moreover, in various embodiments, the total basket weight is periodically monitored to determine whether the total basket weight is greater or less than expected. If the total basket weight is less than expected, a potential hole cleaning problem is identified. Conversely, if the total basket weight is greater than expected, a potential wellbore instability problem is identified. In various embodiments, when a hole cleaning or wellbore instability problem is identified, the total basket weight may also be used to quantitatively determine the amount of missing or excess drill cuttings, respectively, at the surface.

Figure 5:
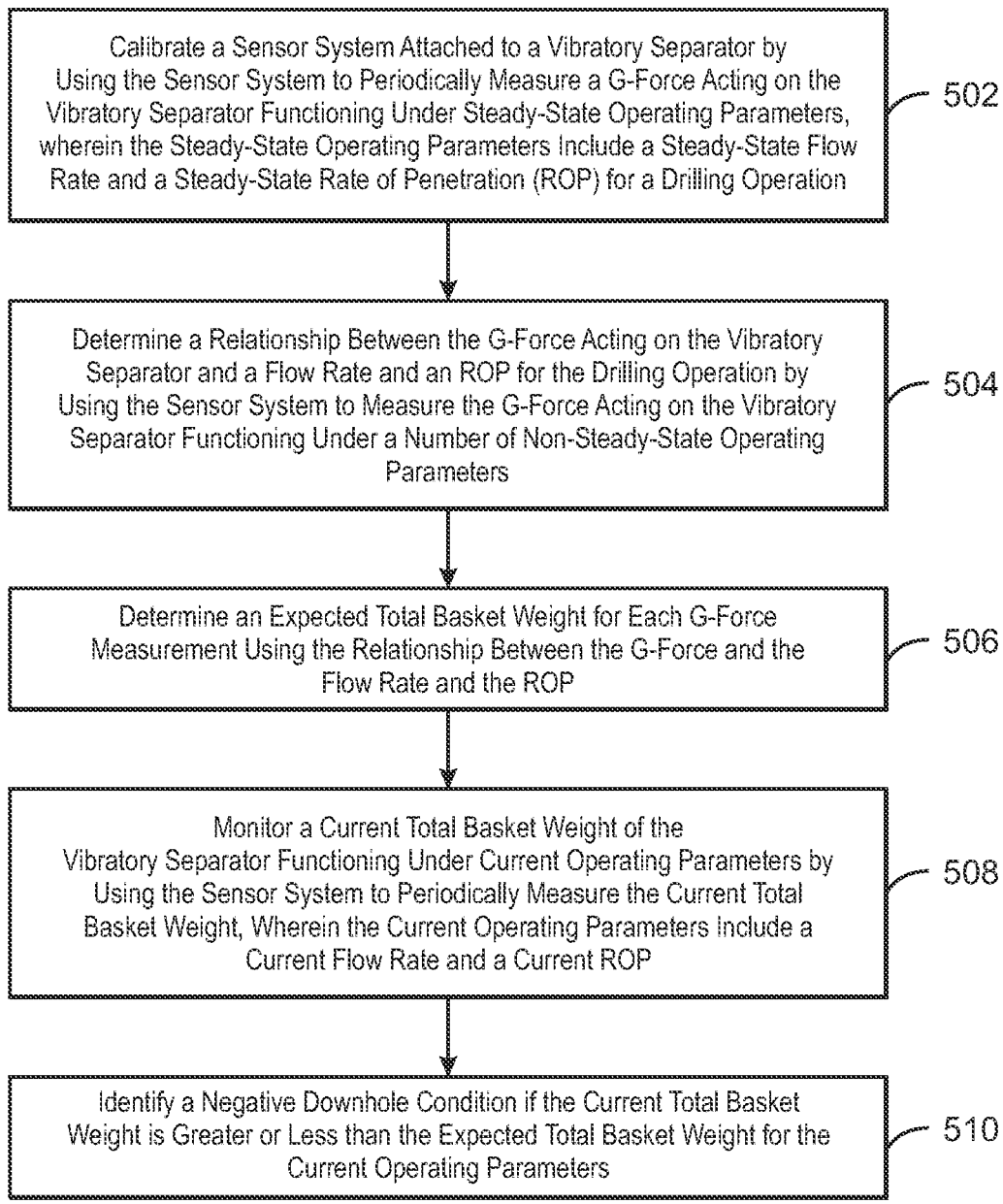
FIG. 5 is a process flow diagram of a method for identifying downhole conditions during a drilling operation using a vibratory separator including a sensor system in accordance with the present techniques.

Methods for Identifying Changing Downhole Conditions During a Drilling Operation Using Vibratory Separator Including Sensor System FIG. 5 is a simplified process flow diagram of a method 500 for identifying downhole conditions during a drilling operation using a vibratory separator including a sensor system in accordance with the present techniques. In some embodiments, the vibratory separator is the same as, or similar to, the vibratory separator 100 described with respect to FIGS. 1 and 2. Moreover, the method 500 is implemented by a computing device. In some embodiments, the computing device is communicably coupled to the sensor system that is attached to the vibratory separator, such as via a Bluetooth or Wi-Fi connection. In some embodiments, the computing device is also communicably coupled (i.e., via a Bluetooth or Wi-Fi connection) to a cuttings scale and/or a high-definition camera that is positioned to take images of the screens of the vibratory separator, as described with respect to FIG. 2. Moreover, in some embodiments, multiple computing devices work together to perform the steps of the method 500. An exemplary cluster computing system that may be used to implement the method 500 is described with respect to FIG. 9, while an exemplary non-transitory, computer-readable storage medium that may be used to store data and modules of program instructions for implementing the method 500 is described with respect to FIG. 10.

The method begins at block 502, at which a sensor system attached to a vibratory separator is calibrated by using the sensor system to periodically measure a G-force acting on the vibratory separator functioning under steady-state operating parameters, wherein the steady-state operating parameters include a steady-state flow rate and a steady-state rate of penetration (ROP) for a drilling operation. An exemplary embodiment of this process is described further with respect to the method 600 of FIG. 6.

At block 504, a relationship between the G-force acting on the vibratory separator and a flow rate and an ROP for the drilling operation is determined by using the sensor system to measure the G-force acting on the vibratory separator functioning under a number of non-steady-state operating parameters, wherein each of the non-steady-state operating parameters includes a non-steady-state flow rate or a non-steady-state ROP. An exemplary embodiment of this process is described further with respect to the method 700 of FIG. 7. In various embodiments, this includes using the sensor system to measure the G-force after each of a predetermined number of incremental ROP reductions from the steady-state ROP, using the sensor system to measure the G-force after each of a predetermined number of incremental flow rate reductions from the steady-state flow rate, using the sensor system to measure the G-force after each of a predetermined number of incremental ROP increases from the steady-state ROP, and using the sensor system to measure the G-force after each of a predetermined number of incremental flow rate increases from the steady-state flow rate. Moreover, in some embodiments, determining the relationship between the G-force, the flow rate, and the ROP includes using the G-force measurements to create a 3-axis nomogram for the G-force versus the flow rate versus the ROP.

At block 506, an expected total basket weight is determined for each G-force measurement using the relationship between the G-force and the flow rate and the ROP. At block 508, a current total basket weight of the vibratory separator functioning under current operating parameters is monitored by using the sensor system to periodically measure the current total basket weight, wherein the current operating parameters include a current flow rate and a current ROP. In various embodiments, this includes using the sensor system to periodically measure the G-force acting on the vibratory separator functioning under the current operating parameters, and then using Eq. (2) to calculate the current total basket weight based on the G-force.

At block 510, a downhole condition is identified if the current total basket weight is greater or less than the expected total basket weight for the current operating parameters. Specifically, a hole cleaning problem is identified if the current total basket weight is less than the expected total basket weight for the current operating parameter, while a wellbore instability problem is identified if the current total basket weight is greater than the expected total basket weight for the current operating parameters. In various embodiments, when a hole cleaning or wellbore instability problem is identified, the current total basket weight may also be used to quantitatively determine the amount of missing or excess drill cuttings, respectively, at the surface, as well as to analyze the drill cuttings loading and discharge from the vibratory separator. This process is described further with respect to the method 800 of FIG. 8. As may be appreciated, various ranges or thresholds may be set for variations of the total basket weight, which may also rely upon the drilling operations and associated timing of the drilling fluid and cuttings returning from the wellbore.

Figure 6:
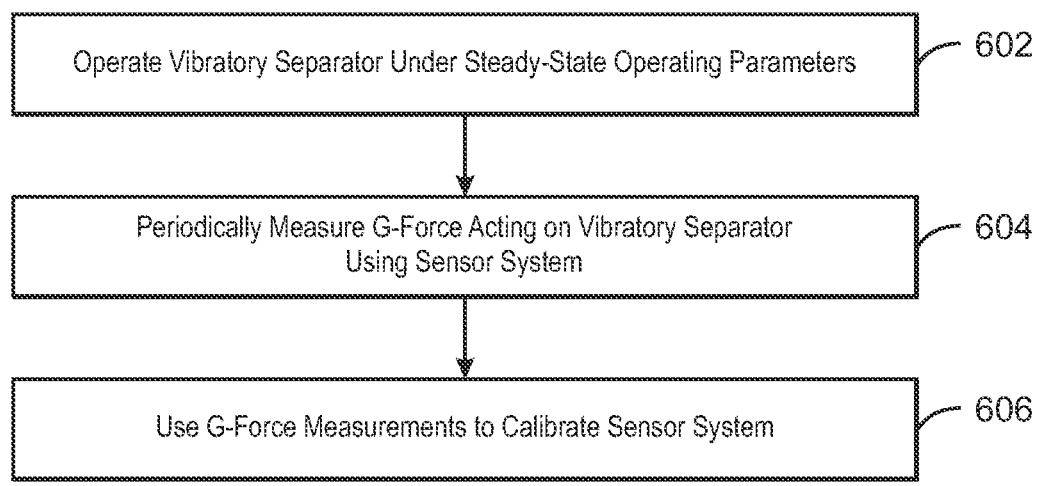
FIG. 6 is a process flow diagram of a method for calibrating a sensor system that is attached to a vibratory separator functioning under steady-state operating parameters in accordance with the present techniques.

FIG. 6 is a process flow diagram of a method 600 for calibrating a sensor system that is attached to a vibratory separator functioning under steady-state operating parameters in accordance with the present techniques. The method begins at block 602, at which the vibratory separator is operated under steady-state operating parameters. At block 604, the G-force acting on the vibratory separator is periodically measured using the sensor system. The measurements may be performed in specific intervals of a measurement per second, a measurement per 10 seconds, a measurement per 30 seconds, a measurement per minute or a measurement per 10 minutes.

At block 606, the G-force measurements are used to calibrate the sensor system. In various embodiments, calibrating the sensor system includes determining details relating to the sensor system's performance and accuracy for the particular vibratory separator. This, in turn, allows the sensor system to be fine-tuned for the particular implementation before the wellbore analysis process proceeds to the next step.

Figure 7:
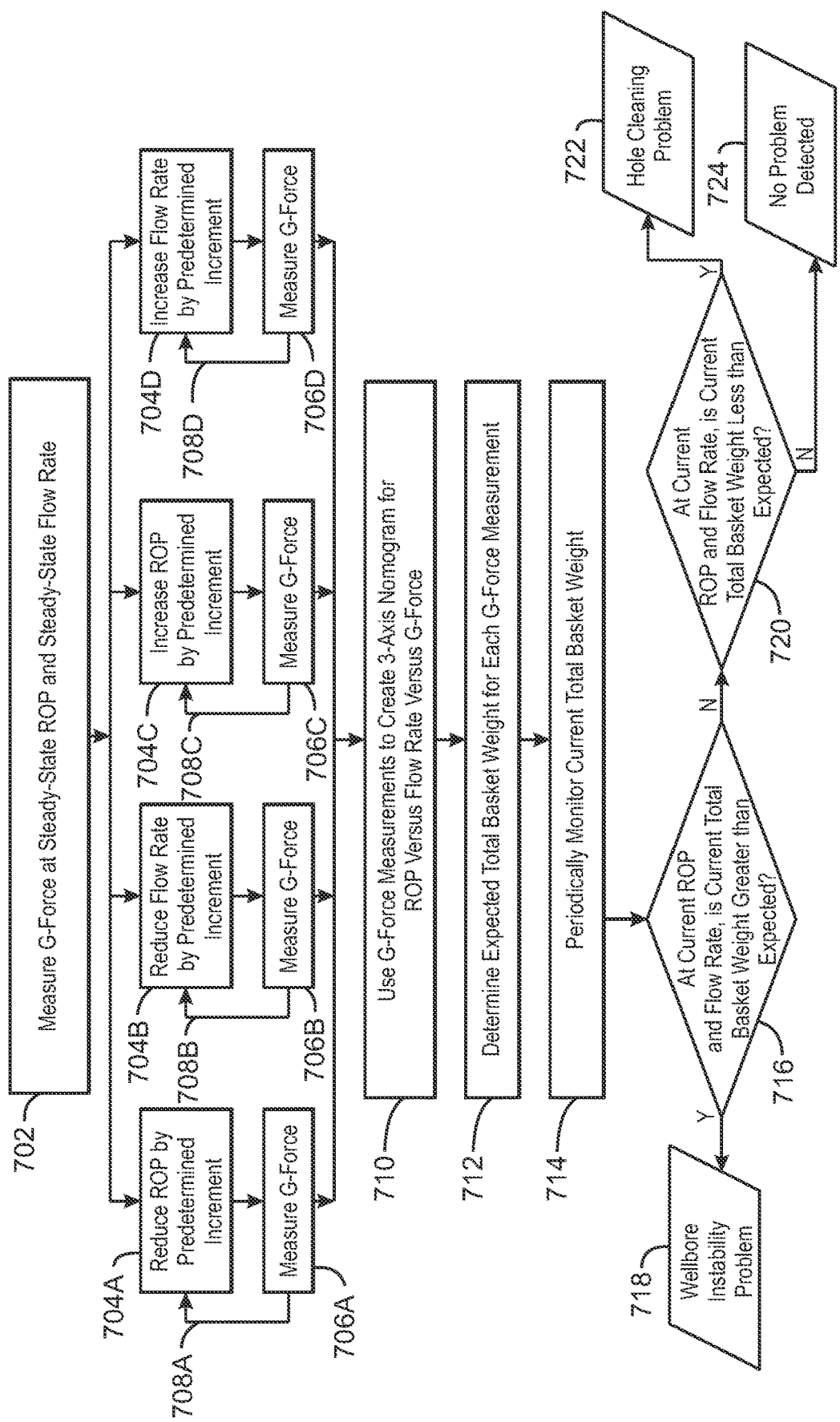
FIG. 7 is a process flow diagram of a method for measuring a degree of hole cleaning and/or wellbore stability using a vibratory separator including a sensor system in accordance with the present techniques.

FIG. 7 is a process flow diagram of a method 700 for measuring a degree of hole cleaning and/or wellbore stability using a vibratory separator including a sensor system in accordance with the present techniques. The method begins at block 702, at which the G-force acting on the vibratory separator operating at a steady-state ROP and a steady-state flow rate is measured.

The ROP is then reduced by a predetermined increment at block 704A, and the G-force is measured at block 706A. This process is repeated a predetermined number of times, as indicated by arrow 708A. After the ROP is returned to the steady-state ROP, the flow rate is reduced by a predetermined increment at block 704B, and the G-force is measured at block 706B. This process is repeated a predetermined number of times, as indicated by arrow 708B. After the flow rate is returned to the steady-state flow rate, the ROP is then increased by a predetermined increment at block 704C, and the G-force is measured at block 706C. This process is repeated a predetermined number of times, as indicated by arrow 708C. Lastly, after the ROP is returned to the steady-state ROP, the flow rate is increased by a predetermined increment at block 704D, and the G-force is measured at block 706D. This process is repeated a predetermined number of times, as indicated by arrow 708D.

It will be understood by one of skill in the art that this process of incrementally increasing and decreasing the ROP and the flow rate can be performed in any order. Moreover, in some embodiments, some of these steps may be omitted altogether. For example, in some embodiments, it is not feasible or preferable to increase the ROP and/or the flow rate. Therefore, in such embodiments, the blocks 704C, 706C, 708C, 704D, 706D, and 708D are omitted from the method 700.

The method 700 then proceeds to block 710, at which the G-force measurements obtained at blocks 706A to 706D are used to create a 3-axis nomogram (or other mathematical model or relationship) for ROP versus flow rate versus G-force. An expected total basket weight is then determined for each G-force measurement at block 712, and the current total basket weight is periodically monitored at block 714.

At block 716, a determination is made about whether the current total basket weight is greater than expected at the current ROP and flow rate. If the current total basket weight is greater than expected, a wellbore instability problem is identified at block 718. If the current total basket weight is not greater than expected, the method 700 proceeds to block 720. At block 720, a determination is made about whether the current total basket weight is less than expected at the current ROP and flow rate. If the current total basket weight is less than expected, a hole cleaning problem is identified at block 722. If the current total basket weight is not less than expected, then no problem is currently detected, as shown at block 724. The method 700 then loops back to block 714, such that the drilling operation is continuously monitored for fluctuating downhole conditions. As may be appreciated, the expected value of the current total basket weight may include a threshold or range of values to manage variations in the total basket weight.

Figure 8:
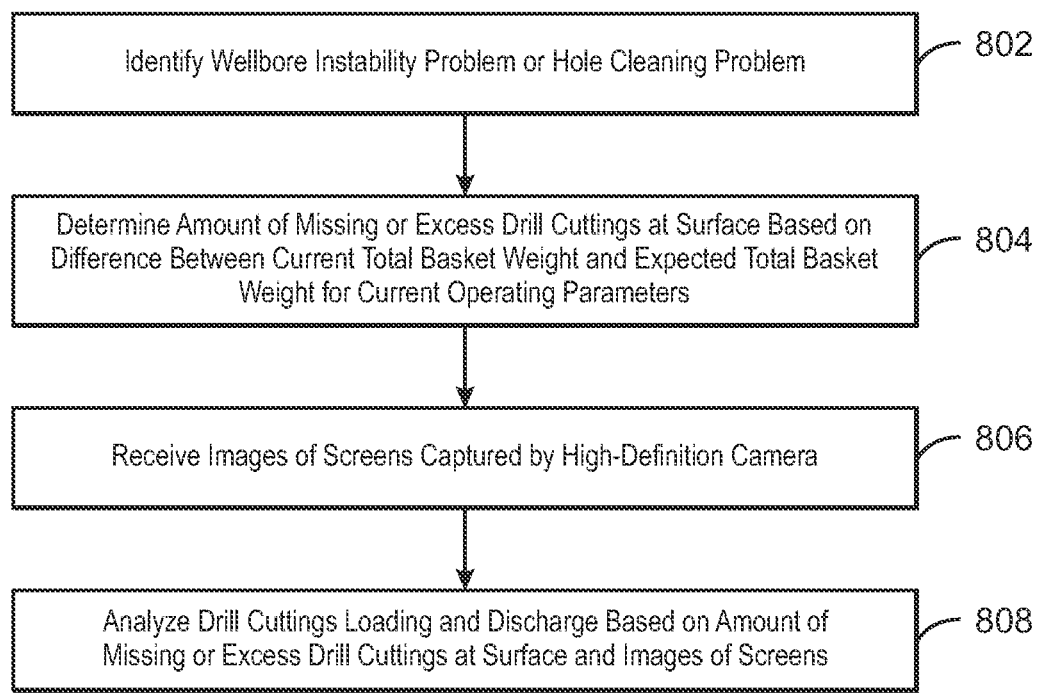
FIG. 8 is a process flow diagram of a method for analyzing cuttings loading and discharge using a vibratory separator including a sensor system and an attached high-definition camera in accordance with the present techniques.

FIG. 8 is a process flow diagram of a method 800 for analyzing cuttings loading and discharge using a vibratory separator including a sensor system and an attached high-definition camera in accordance with the present techniques. The method begins at block 802, at which a wellbore instability problem or a hole cleaning problem is identified. In various embodiments, this is accomplished via any of the methods 500, 600, and/or 700 described with respect to FIGS. 5, 6, and 7, respectively.

At block 804, an amount of missing or excess drill cuttings at surface is determined based on the difference between the current total basket weight and the expected total basket weight for current operating parameters. In addition, at block 806, the computing device receives images of the screens of the vibratory separator, which are captured by a high-definition camera.

At block 808, drill cuttings loading and discharge are analyzed based on the amount of missing or excess drill cuttings at the surface and the images of the screens received from the high-definition camera. In various embodiments, this analysis is performed to provide additional details regarding the identified downhole condition. Specifically, analyzing the drill cuttings loading and discharge may include determining the shapes, sizes, and other characteristics of the drill cuttings. Such information may be useful for determining appropriate intervention measures that optimizes the drilling operation.

The process flow diagram of FIGS. 5 to 8 are not intended to indicate that the steps of the methods 500, 600, 700, and 800 are to be executed in any particular order, or that all of the steps of the methods 500, 600, 700, and 800 are to be included in every case. Further, any number of additional or alternative steps not shown in FIGS. 5 to 8 may be included within any of the methods 500, 600, 700, and/or 800, respectively, depending on the details of the specific implementation.

Figure 9:
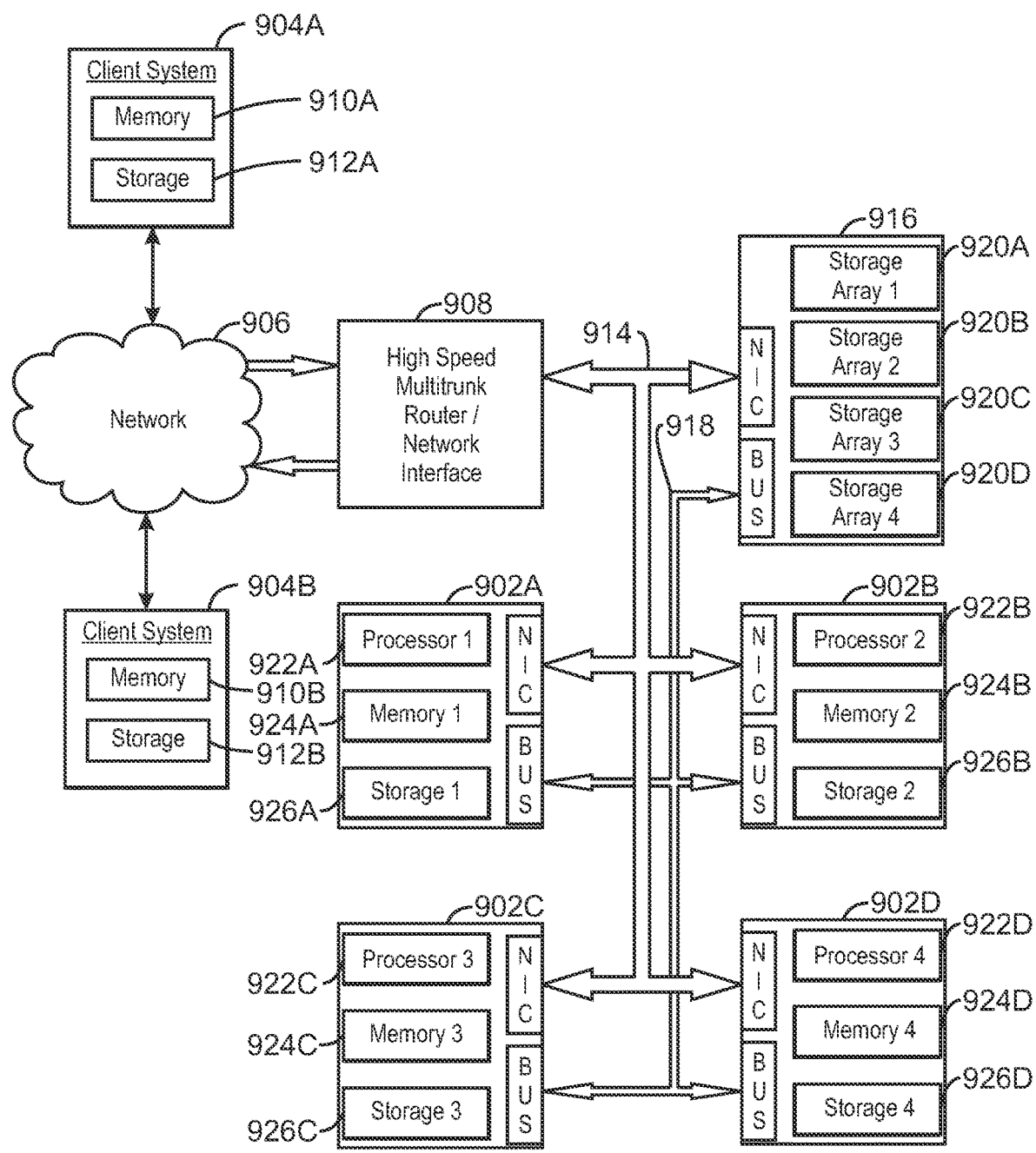
FIG. 9 is a block diagram of an exemplary cluster computing system that may be used to implement the wellbore analysis techniques described herein using data received from one or more sensor systems attached to one or more corresponding vibratory separators in accordance with the present techniques.

Exemplary Cluster Computing System for Implementing Wellbore Analysis Techniques Described Herein FIG. 9 is a block diagram of an exemplary cluster computing system 900 that may be used to implement the wellbore analysis techniques described herein using data received from one or more sensor systems (and, optionally, one or more cuttings scales and/or one or more high-definition cameras) attached to one or more corresponding vibratory separators in accordance with the present techniques. The exemplary cluster computing system 900 shown in FIG. 9 has four computing units 902A, 902B, 902C, and 902D, each of which may perform calculations for a portion of the wellbore analysis techniques described herein. However, one of ordinary skill in the art will recognize that the cluster computing system 900 is not limited to this configuration, as any number of computing configurations may be selected. For example, a smaller analysis may be run on a single computing unit, such as a workstation, while a large calculation may be run on a cluster computing system 900 having tens, hundreds, thousands, or even more computing units.

The cluster computing system 900 may be accessed from any number of client systems 904A and 904B over a network 906, for example, through a high-speed network interface 908. The computing units 902A to 902D may also function as client systems, providing both local computing support and access to the wider cluster computing system 900.

The network 906 may include a local area network (LAN), a wide area network (WAN), the Internet, or any combinations thereof. Each client system 904A and 904B may include one or more non-transitory, computer-readable storage media for storing the operating code and program instructions that are used to implement the wellbore analysis techniques described herein. For example, each client system 904A and 904B may include a memory device 910A and 910B, which may include random access memory (RAM), read only memory (ROM), and the like. Each client system 904A and 904B may also include a storage device 912A and 912B, which may include any number of hard drives, optical drives, flash drives, or the like.

The high-speed network interface 908 may be coupled to one or more buses in the cluster computing system 900, such as a communications bus 914. The communication bus 914 may be used to communicate instructions and data from the high-speed network interface 908 to a cluster storage system 916 and to each of the computing units 902A to 902D in the cluster computing system 900. The communications bus 914 may also be used for communications among the computing units 902A to 902D and the cluster storage system 916. In addition to the communications bus 914, a high-speed bus 918 can be present to increase the communications rate between the computing units 902A to 902D and/or the cluster storage system 916.

The cluster storage system 916 can have one or more non-transitory, computer-readable storage media, such as storage arrays 920A, 920B, 920C and 920D for the storage of models, data, visual representations, results, code, or other information, for example, concerning the implementation of and results from the wellbore analysis techniques described herein. The storage arrays 920A to 920D may include any combinations of hard drives, optical drives, flash drives, or the like.

Each computing unit 902A to 902D can have a processor 922A, 922B, 922C and 922D and associated local non-transitory, computer-readable storage media, such as a memory device 924A, 924B, 924C and 924D and a storage device 926A, 926B, 926C and 926D. Each processor 922A to 922D may be a multiple core unit, such as a multiple core central processing unit (CPU) or a graphics processing unit (GPU). Each memory device 924A to 924D may include ROM and/or RAM used to store program instructions for directing the corresponding processor 922A to 922D to implement the wellbore analysis techniques described herein. Each storage device 926A to 926D may include one or more hard drives, optical drives, flash drives, or the like. In addition, each storage device 926A to 926D may be used to provide storage for models, intermediate results, data, images, or code associated with operations, including code used to implement the wellbore analysis techniques described herein.

The present techniques are not limited to the architecture or unit configuration illustrated in FIG. 9. For example, any suitable processor-based device may be utilized for implementing all or a portion of embodiments of the wellbore analysis techniques described herein, including without limitation personal computers, laptop computers, computer workstations, mobile devices, and multi-processor servers or workstations with (or without) shared memory. Moreover, embodiments may be implemented on application specific integrated circuits (ASICs) or very-large-scale integrated (VLSI) circuits. In fact, persons of ordinary skill in the art may utilize any number of suitable structures capable of executing logical operations according to embodiments described herein.

Figure 10:
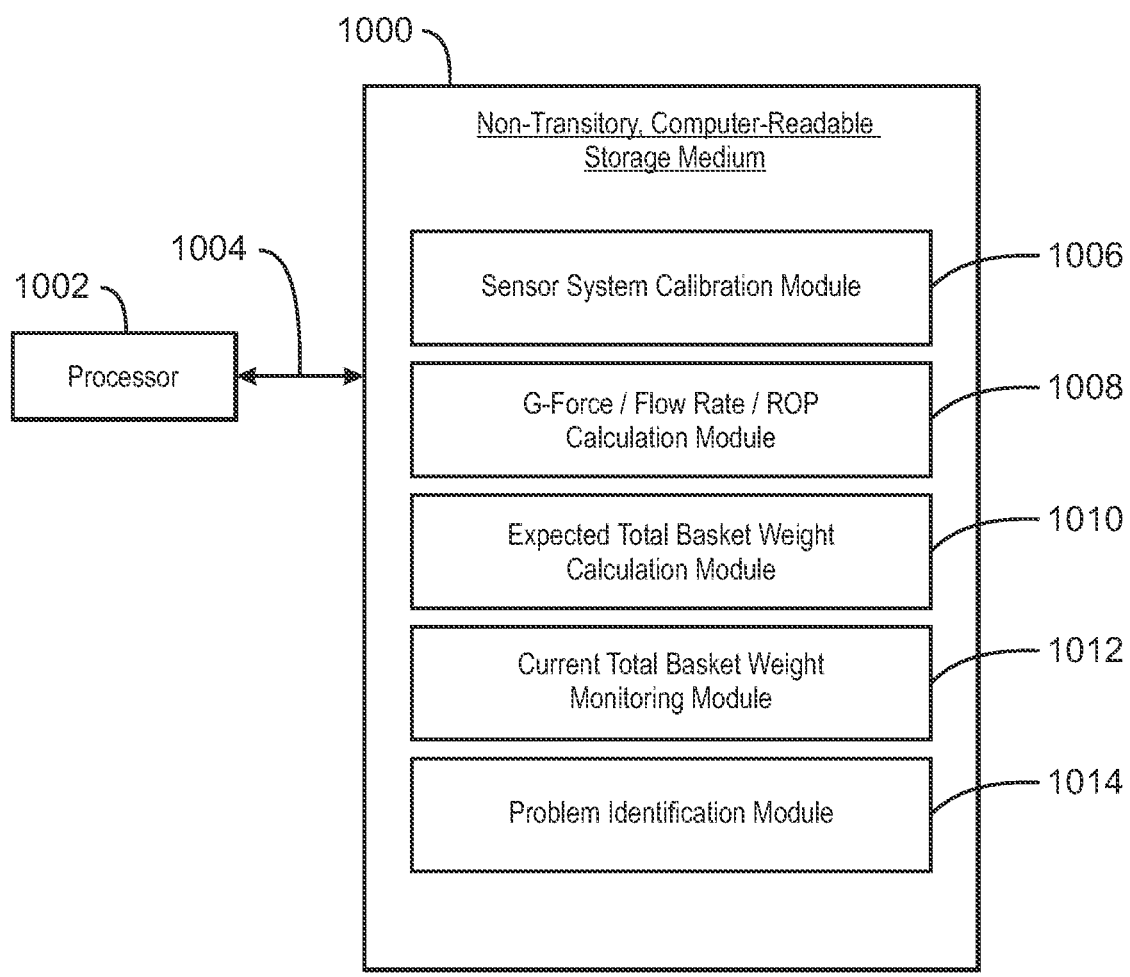
FIG. 10 is a block diagram of an exemplary non-transitory, computer-readable storage medium that may be used for the storage of data and modules of program instructions for implementing the wellbore analysis techniques in accordance with the present techniques.

FIG. 10 is a block diagram of an exemplary non-transitory, computer-readable storage medium 1000 that may be used for the storage of data and modules of program instructions for implementing the wellbore analysis techniques in accordance with the present techniques. The non-transitory, computer-readable storage medium 1000 may include a memory device, a hard disk, and/or any number of other devices, as described with respect to FIG. 9. A processor 1002 may access the non-transitory, computer-readable storage medium 1000 over a bus or network 1004. While the non-transitory, computer-readable storage medium 1000 may include any number of modules for implementing techniques described herein, in some embodiments, the non-transitory, computer-readable storage medium 1000 includes a sensor system calibration module 1006, a G-force/flow rate/ROP calculation module 1008, an expected total basket weight calculation module 1010, a current total basket weight monitoring module 1012, and a problem identification module 1014. In some embodiments, the non-transitory, computer-readable storage medium 1000 also includes a drill cuttings analysis module (not shown).

In one or more embodiments, the potential downhole condition may be determined from the present techniques. As may be appreciated and as noted above, the downhole conditions and situations are indicated by the monitored information. As an example, the change in either cuttings being returned or fluid rate associated with those cuttings returned may identify a problematic hole condition that is developing. As a specific example, excess cuttings are the result of the hole instability and requires additional mud weight and/or mud chemistry adjustments to offset those downhole conditions. If adjustments are not performed, casing may have to be set early. As another example, hole cleaning problems may be indicated by the same fluid rate being returned, but less cuttings being returned. This downhole condition or situation requires mud weight and/or mud chemistry adjustments to offset conditions. At times, drilling parameters can be adjusted to offset (e.g., higher flow rate, faster RPM). Both of these examples may be represent hole instability problems. Further, lost returns (e.g., less fluid being returned) requires treatment with lost circulation material in the mud, which may be performed by an entire mud system or discreet pill placement. If adjustments are not performed, casing may have to be set early.

As a further example, when the mud weight equivalent hydrostatic pressure falls below wellbore collapse pressure, it initiates wellbore instability (e.g., wellbore enlargement). Initially, this dysfunction produces an abnormally high quantity of cuttings compared to steady-state conditions of flow rate/rate of penetration/fluid low end rheology. This hole instability problem is detected as a decrease in available G force at the shaker (e.g., equivalent to an increase in basket total weight). As wellbore instability is a time dependent phenomena, early detection may lessen or arrest its progression. If left unattended, the wellbore instability may result in a catastrophic failure of the wellbore, stuck pipe and/or the requirement of sidetracking around portions of the wellbore.

As yet another example, the annular velocities across the enlarged area can fall below the fluid velocity required to transport cuttings to surface. As the wellbore continues to enlarge, this problem manifests as a reduced amount of cuttings to surface, and, subsequently, an increase in G force compared to steady-state conditions (e.g., reduced basket total weight). Such events are usually preceding pack-offs and potential stuck pipe. Accordingly, any early detection may be used to adjust operations to address this problem (e.g., changing rheology, performing short trips or performing clean-up cycles).

Moreover, a low end rheology may be reduced below the fluids ability to transport cuttings to the surface (e.g., low 6 revolutions per minute (rpm) reading and low shear yield point). As a result, the total basket weight decreases when compared to steady-state conditions, manifested as an increase in G force measured at surface. The low end rheology may be due to mud treatment (e.g., dilution, premix additions, thinners). As a result, large accumulations of cuttings downhole can lead to pack-offs and the inability to trip pipe and/or run casing. Accordingly, any early detection may be used to adjust operations to address this problem (e.g., changing rheology, performing short trips or performing clean-up cycles).

Similarly, lost circulation events may be observed by the reduction of total fluid flow to the surface. Such events may be corroborated by a reduced amount of cuttings at the shaker (e.g., higher G force due to reduced combined basket weight). The combined basket weight is the total weight of the shaker's vibratory basket plus screens plus drilling fluid plus cuttings at a given time per unit time (e.g., sum of the shaker's vibratory basket, screens, drilling fluid, cuttings at a given time per unit time). Accordingly, detection may be used to adjust operations, such as treatment with lost circulation material in the mud, which may be performed by treating the entire mud system or by placement of a discreet pill.

Further still, early MTC (massive transport complexes) detection may also be determined from the present techniques. MTCs are a geological feature more common offshore of trapped pressure (e.g., usually fresh water and reactive clay-based sediment) due to sudden mud flows or turbiditic currents. When encountered, depending on the amount of pressure trapped within the complex, such events may generate excessive amount of cuttings, at the same time with a decrease of the fluids total salinity (or an increase in water activity). Early detection of such feature may allow for an increase in mud weight (if possible), prolonged bottoms up circulations to clean the wellbore or, depending on the flow intensity, the decision to sidetrack the well.

In one or more embodiments, the present techniques may be susceptible to various modifications and alternative forms, such as the following embodiments as noted in paragraphs 1 to 15:

1. A method for identifying a downhole condition during a drilling operation using a vibratory separator, comprising: calibrating, via a computing device, a sensor system attached to a vibratory separator by using the sensor system to periodically measure a G-force acting on the vibratory separator functioning under steady-state operating parameters, wherein the steady-state operating parameters comprise a steady-state flow rate and a steady-state rate of penetration (ROP) for a drilling operation; determining a relationship between the G-force acting on the vibratory separator and a flow rate and an ROP for the drilling operation by using the sensor system to measure the G-force acting on the vibratory separator functioning under a plurality of non-steady-state operating parameters; determining an expected total basket weight for each G-force measurement using the relationship between the G-force and the flow rate and the ROP; monitoring a current total basket weight of the vibratory separator functioning under current operating parameters by using the sensor system to periodically measure the current total basket weight, wherein the current operating parameters comprise a current flow rate and a current ROP; and identifying a downhole condition if the current total basket weight is greater or less than the expected total basket weight for the current operating parameters.

2. The method of paragraph 1, wherein identifying the downhole condition comprises: identifying a hole cleaning problem if the current total basket weight is less than the expected total basket weight for the current operating parameters; or identifying a wellbore instability problem if the current total basket weight is greater than the expected total basket weight for the current operating parameters.

3. The method of paragraph 1 or 2, comprising determining an amount of missing or excess drill cuttings based a difference between the current total basket weight and the expected total basket weight for the current operating parameters.

4. The method of paragraph 3, comprising: receiving, at the computing device, images of one or more screens of the vibratory separator captured by a high-definition camera; and analyzing drill cuttings loading and discharge based on the amount of missing or excess drill cuttings and the images of the one or more screens.

5. The method of any of paragraphs 1 to 4, wherein determining the relationship between the G-force and the flow rate and the ROP by using the sensor system to measure the G-force acting on the vibratory separator functioning under the plurality of non-steady-state operating parameters comprises: using the sensor system to measure the G-force after each of a predetermined number of incremental ROP reductions from the steady-state ROP; using the sensor system to measure the G-force after each of a predetermined number of incremental flow rate reductions from the steady-state flow rate; using the sensor system to measure the G-force after each of a predetermined number of incremental ROP increases from the steady-state ROP; and using the sensor system to measure the G-force after each of a predetermined number of incremental flow rate increases from the steady-state flow rate.

6. The method of any of paragraphs 1 to 5, comprising determining the relationship between the G-force and the flow rate and the ROP by using the G-force measurements to create a 3-axis nomogram for the G-force versus the flow rate versus the ROP.

7. The method of any of paragraphs 1 to 6, comprising: monitoring an acoustic fingerprint of the vibratory separator by using the sensor system to periodically measure acoustic signals emanating from the vibratory separator; and using the acoustic fingerprint to augment the G-force measurements obtained by the vibratory separator.

8. The method of any of paragraphs 1 to 7, comprising: monitoring a weight of a basket of the vibratory separator using a cuttings scale; and using the weight of the basket to augment the G-force measurements obtained by the vibratory separator.

9. A computing system, comprising: a processor; and a non-transitory, computer-readable storage medium, comprising code configured to direct the processor to: calibrate a sensor system attached to a vibratory separator by using the sensor system to periodically measure a G-force acting on the vibratory separator functioning under steady-state operating parameters, wherein the steady-state operating parameters comprise a steady-state flow rate and a steady-state rate of penetration (ROP) for a drilling operation; determine a relationship between the G-force acting on the vibratory separator and a flow rate and an ROP for the drilling operation by using the sensor system to measure the G-force acting on the vibratory separator functioning under a plurality of non-steady-state operating parameters; determine an expected total basket weight for each G-force measurement using the relationship between the G-force and the flow rate and the ROP; monitor a current total basket weight of the vibratory separator functioning under current operating parameters by using the sensor system to periodically measure the current total basket weight, wherein the current operating parameters comprise a current flow rate and a current ROP; and identify a downhole condition if the current total basket weight is greater or less than the expected total basket weight for the current operating parameters.

10. The computing system of paragraph 9, wherein the downhole condition comprises a hole cleaning problem if the current total basket weight is less than the expected total basket weight for the current operating parameters or a wellbore instability problem if the current total basket weight is greater than the expected total basket weight for the current operating parameters.

11. The computing system of paragraph 9 or 10, wherein the non-transitory, computer-readable storage medium comprises code configured to direct the processor to determine an amount of missing or excess drill cuttings based a difference between the current total basket weight and the expected total basket weight for the current operating parameters.

12. The computing system of paragraph 11, wherein the non-transitory, computer-readable storage medium comprises code configured to direct the processor to: receive images of one or more screens of the vibratory separator captured by a high-definition camera; and analyze drill cuttings loading and discharge based on the amount of missing or excess drill cuttings and the images of the one or more screens.

13. The computing system of any of paragraphs 9 to 12, wherein the non-transitory, computer-readable storage medium comprises code configured to direct the processor to determine the relationship between the G-force and the flow rate and the ROP by: using the sensor system to measure the G-force after each of a predetermined number of incremental ROP reductions from the steady-state ROP; using the sensor system to measure the G-force after each of a predetermined number of incremental flow rate reductions from the steady-state flow rate; using the sensor system to measure the G-force after each of a predetermined number of incremental ROP increases from the steady-state ROP; and using the sensor system to measure the G-force after each of a predetermined number of incremental flow rate increases from the steady-state flow rate.

14. The computing system of any of paragraphs 9 to 13, wherein the non-transitory, computer-readable storage medium comprises code configured to direct the processor to determine the relationship between the G-force and the flow rate and the ROP by using the G-force measurements to create a 3-axis nomogram for the G-force versus the flow rate versus the ROP.

15. The computing system of any of paragraphs 9 to 14, wherein the non-transitory, computer-readable storage medium comprises code configured to direct the processor to: monitor an acoustic fingerprint of the vibratory separator by using the sensor system to periodically measure acoustic signals emanating from the vibratory separator; and use the acoustic fingerprint to augment the G-force measurements obtained by the vibratory separator.

Moreover, while the embodiments described herein are well-calculated to achieve the advantages set forth, it will be appreciated that such embodiments are susceptible to modification, variation, and change without departing from the spirit thereof. Indeed, the present techniques include all alternatives, modifications, and equivalents falling within the true spirit and scope of the appended claims.

What is claimed is:

1. A method for identifying a downhole condition during a drilling operation using a vibratory separator, comprising:
    calibrating, via a computing device, a sensor system attached to a vibratory separator by using the sensor system to periodically measure a G-force acting on the vibratory separator functioning under steady-state operating parameters, wherein the steady-state operating parameters comprise a steady-state flow rate and a steady-state rate of penetration (ROP) for a drilling operation;
    determining a relationship between the G-force acting on the vibratory separator and a flow rate and an ROP for the drilling operation by using the sensor system to measure the G-force acting on the vibratory separator functioning under a plurality of non-steady-state operating parameters;
    determining an expected total basket weight for each G-force measurement using the relationship between the G-force and the flow rate and the ROP;
    monitoring a current total basket weight of the vibratory separator functioning under current operating parameters by using the sensor system to periodically measure the current total basket weight, wherein the current operating parameters comprise a current flow rate and a current ROP; and
    identifying a downhole condition if the current total basket weight is greater or less than the expected total basket weight for the current operating parameters.

2. The method of claim 1, wherein identifying the downhole condition comprises:
    identifying a hole cleaning problem if the current total basket weight is less than the expected total basket weight for the current operating parameters; or
    identifying a wellbore instability problem if the current total basket weight is greater than the expected total basket weight for the current operating parameters.

3. The method of claim 1, comprising determining an amount of missing or excess drill cuttings based a difference between the current total basket weight and the expected total basket weight for the current operating parameters.

4. The method of claim 3, comprising:
    receiving, at the computing device, images of one or more screens of the vibratory separator captured by a high-definition camera; and
    analyzing drill cuttings loading and discharge based on the amount of missing or excess drill cuttings and the images of the one or more screens.

5. The method of claim 1, wherein determining the relationship between the G-force and the flow rate and the ROP by using the sensor system to measure the G-force acting on the vibratory separator functioning under the plurality of non-steady-state operating parameters, comprises:
    using the sensor system to measure the G-force after each of a predetermined number of incremental ROP reductions from the steady-state ROP;
    using the sensor system to measure the G-force after each of a predetermined number of incremental flow rate reductions from the steady-state flow rate;

using the sensor system to measure the G-force after each of a predetermined number of incremental ROP increases from the steady-state ROP; and using the sensor system to measure the G-force after each of a predetermined number of incremental flow rate increases from the steady-state flow rate.

6. The method of claim 1, comprising determining the relationship between the G-force and the flow rate and the ROP by using the G-force measurements to create a 3-axis nomogram for the G-force versus the flow rate versus the ROP.

7. The method of claim 1, comprising:
monitoring an acoustic fingerprint of the vibratory separator by using the sensor system to periodically measure acoustic signals emanating from the vibratory separator; and
using the acoustic fingerprint to augment the G-force measurements obtained by the vibratory separator.

8. The method of claim 1, comprising:
monitoring a weight of a basket of the vibratory separator using a cuttings scale; and
using the weight of the basket to augment the G-force measurements obtained by the vibratory separator.

9. A computing system, comprising:
a processor; and
a non-transitory, computer-readable storage medium, comprising code configured to direct the processor to:
calibrate a sensor system attached to a vibratory separator by using the sensor system to periodically measure a G-force acting on the vibratory separator functioning under steady-state operating parameters, wherein the steady-state operating parameters comprise a steady-state flow rate and a steady-state rate of penetration (ROP) for a drilling operation;
determine a relationship between the G-force acting on the vibratory separator and a flow rate and an ROP for the drilling operation by using the sensor system to measure the G-force acting on the vibratory separator functioning under a plurality of non-steady-state operating parameters;
determine an expected total basket weight for each G-force measurement using the relationship between the G-force and the flow rate and the ROP;
monitor a current total basket weight of the vibratory separator functioning under current operating parameters by using the sensor system to periodically measure the current total basket weight, wherein the current operating parameters comprise a current flow rate and a current ROP; and
identify a downhole condition if the current total basket weight is greater or less than the expected total basket weight for the current operating parameters.

10. The computing system of claim 9, wherein the downhole condition comprises a hole cleaning problem if the current total basket weight is less than the expected total basket weight for the current operating parameters or a wellbore instability problem if the current total basket weight is greater than the expected total basket weight for the current operating parameters.

11. The computing system of claim 9, wherein the non-transitory, computer-readable storage medium comprises code configured to direct the processor to determine an amount of missing or excess drill cuttings based a difference between the current total basket weight and the expected total basket weight for the current operating parameters.

12. The computing system of claim 11, wherein the non-transitory, computer-readable storage medium comprises code configured to direct the processor to:
receive images of one or more screens of the vibratory separator captured by a high-definition camera; and
analyze drill cuttings loading and discharge based on the amount of missing or excess drill cuttings and the images of the one or more screens.

13. The computing system of claim 9, wherein the non-transitory, computer-readable storage medium comprises code configured to direct the processor to determine the relationship between the G-force and the flow rate and the ROP by:
using the sensor system to measure the G-force after each of a predetermined number of incremental ROP reductions from the steady-state ROP;
using the sensor system to measure the G-force after each of a predetermined number of incremental flow rate reductions from the steady-state flow rate;
using the sensor system to measure the G-force after each of a predetermined number of incremental ROP increases from the steady-state ROP; and
using the sensor system to measure the G-force after each of a predetermined number of incremental flow rate increases from the steady-state flow rate.

14. The computing system of claim 9, wherein the non-transitory, computer-readable storage medium comprises code configured to direct the processor to determine the relationship between the G-force and the flow rate and the ROP by using the G-force measurements to create a 3-axis nomogram for the G-force versus the flow rate versus the ROP.

15. The computing system of claim 9, wherein the non-transitory, computer-readable storage medium comprises code configured to direct the processor to:
monitor an acoustic fingerprint of the vibratory separator by using the sensor system to periodically measure acoustic signals emanating from the vibratory separator; and
use the acoustic fingerprint to augment the G-force measurements obtained by the vibratory separator.

16. A non-transitory, computer-readable storage medium, comprising program instructions that are executable by a processor to cause the processor to:
calibrate a sensor system attached to a vibratory separator by using the sensor system to periodically measure a G-force acting on the vibratory separator functioning under steady-state operating parameters, wherein the steady-state operating parameters comprise a steady-state flow rate and a steady-state rate of penetration (ROP) for a drilling operation;
determine a relationship between the G-force acting on the vibratory separator and a flow rate and an ROP of the drilling operation by using the sensor system to measure the G-force acting on the vibratory separator functioning under a plurality of non-steady-state operating parameters;
determine an expected total basket weight for each G-force measurement using the relationship between the G-force and the flow rate and the ROP;
monitor a current total basket weight of the vibratory separator functioning under current operating parameters by using the sensor system to periodically measure the current total basket weight, wherein the current operating parameters comprise a current flow rate and a current ROP; and identify a downhole condition if the current total basket weight is greater or less than the expected total basket weight for the current operating parameters.

17. The non-transitory, computer-readable storage medium of claim 16, wherein the downhole condition comprises a hole cleaning problem if the current total basket weight is less than the expected total basket weight for the current operating parameters or a wellbore instability problem if the current total basket weight is greater than the expected total basket weight for the current operating parameters.

18. The non-transitory, computer-readable storage medium of claim 16, wherein the program instructions are executable by the processor to cause the processor to determine an amount of missing or excess drill cuttings based a difference between the current total basket weight and the expected total basket weight for the current operating parameters.

19. The non-transitory, computer-readable storage medium of claim 18, wherein the program instructions are executable by the processor to cause the processor to:

receive images of one or more screens of the vibratory separator captured by a high-definition camera; and analyze drill cuttings loading and discharge based on the amount of missing or excess drill cuttings and the images of the one or more screens.

20. The non-transitory, computer-readable storage medium of claim 16, wherein the program instructions are executable by the processor to cause the processor to determine the relationship between the G-force and the flow rate and the ROP by using the G-force measurements to create a 3-axis nomogram for the G-force versus the flow rate versus the ROP.

* * * * *